Feb. 14, 1961   J. R. GOMERSALL   2,972,038
CONTROL FOR COFFEE MAKER
Filed March 10, 1958

INVENTOR.
John R. Gomersall
BY
Karl H. Sommermeyer
attys.

United States Patent Office 2,972,038
Patented Feb. 14, 1961

2,972,038

CONTROL FOR COFFEE MAKER

John R. Gomersall, Elgin, Ill., assignor to McGraw-Edison Company, Elgin, Ill., a corporation of Delaware Filed Mar. 10, 1958, Ser. No. 720,463

4 Claims. (Cl. 219—44)

This invention is concerned with a domestic appliance, and more particularly with a thermostat for a coffeepot.

In electric coffeepots or percolators, it is common practice to provide a pair of heating elements, one of high wattage, and one of relatively low wattage. The high wattage heating element is first connected in circuit to heat the coffee to percolating temperature. After the coffee has percolated for a predetermined length of time, as determined by the temperature of an associated thermostat, the thermostat connects the low wattage or "keep warm" heating element in series with the high wattage element, or in place thereof. As will be appreciated, it is desirable for the thermostat contacts to open and close rapidly in order to avoid arcing and burning of the contacts. It has been proposed heretofore to utilize a magnet in a thermostat for effecting such rapid movement, since the force exerted by the magnet on an armature carried by the bimetal varies with the square of the distance between the magnet and the armature. Such thermostats have commonly been of the low voltage type wherein the bimetal itself carries the operating current, and wherein the armature is mounted directly on the bimetal for retraction of the armature by the bimetal upon cooling thereof.

Magnets have not heretofore been successfully incorporated in three-condition thermostat circuits, to the best of my knowledge. As will be appreciated, in high wattage circuit such as electric coffeepots or percolators, it is undesirable for the bimetal to act as a current-carrying element since the current may cause heating of the bimetal. Incorporation of contacts mounted separately of the bimetal introduces problems not contemplated by the simple two-circuit magnetic thermostats heretofore produced.

It is an object of this invention to provide a superior three-circuit thermostat, i.e., one which is in "off" position, or in either of two operating positions.

Furthermore, it is an object of this invention to provide an improved three-circuit or three-condition thermostat in an electric percolator or the like, said thermostat incorporating a magnet for effecting rapid opening of the contacts and further incorporating means for moving the contacts away from the magnet.

Other and further objects and advantages of the present invention will be apparent from the following description when taken in connection with the accompanying drawings wherein.

Figure 1:
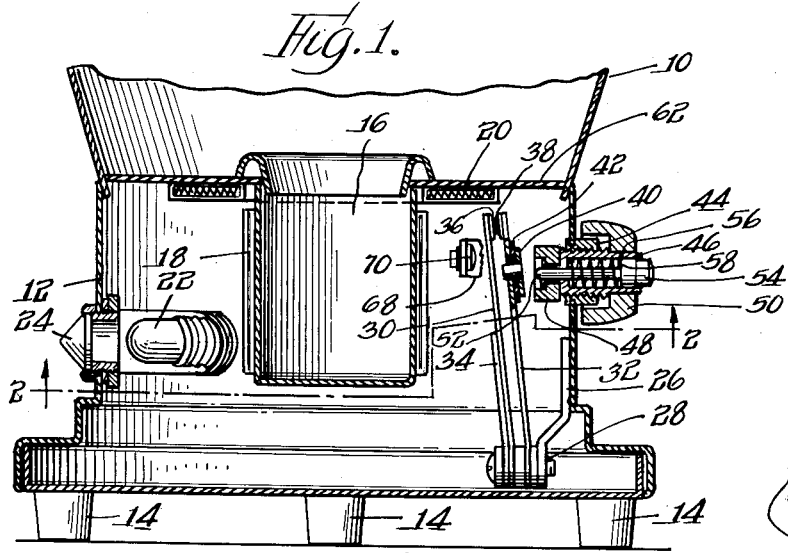
Fig. 1 is a fragmentary view in vertical section of the bottom of an electric percolator incorporating the principles of this invention.
Figure 3:
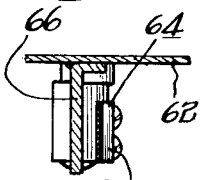
Fig. 3 is a vertical sectional view taken substantially along the line 3—3 in Fig. 2.
Figure 2:
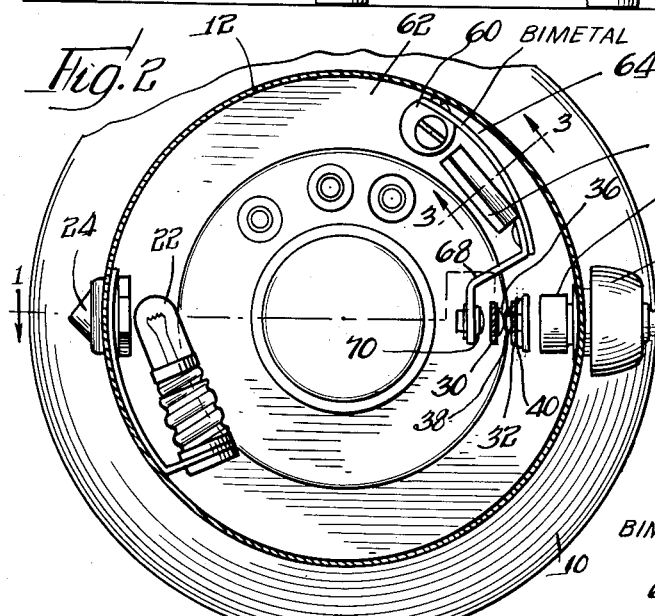
Fig. 2 is a horizontal sectional view taken substantially along the line 2—2 in Fig. 1.

Referring now in greater particularity to the drawings, and first to Figs. 1 and 2, there will be seen a fragmentary showing of a coffeepot or electric percolator of generally conventional construction, including a body 10 having a hollow base 12 with depending insulating feet 14 for protecting a table or the like from the heat of the percolator. The percolator includes the usual percolating well 16 having the main or high wattage heating element 18 disposed as a cylinder thereabout, and having the "keep warm" element 20 disposed as a ring about the top thereof and beneath the main quantity of liquid in the coffeepot. The coffeepot or percolator also is provided with the usual pilot light 22 and red glass window 24 for indicating when the percolator is turned on.

A bracket 26 is affixed to the inside of the wall of the base 12, and is provided with an offset flange 28 insulatedly mounting a pair of contact arms 30 and 32. The arm 30 is the nominally "fixed" arm, and is provided with a rigid backing strip 34 limiting the position of the arm to the left, as shown in Fig. 1. Correspondingly, the arm 32 is the nominally "movable" arm. The fixed arm 30 carries a contact 36 at its upper extremity, and a contact 38 is carried by the movable arm in opposition thereto, the contacts normally being in engagement as shown in Fig. 1. An iron armature 40 is mounted on the side of the movable arm 32, and is insulated therefrom as indicated at 42.

A threaded bushing 44 is provided in the side wall of the base 12 adjacent the arms 30 and 32, and a cylindrical sleeve 46 is threaded through this bushing. A magnet 48 is fixed on the inner end of the sleeve in alignment with the armature 40, and an adjustment knob 50 is fixed on the outer end of the sleeve. Rotation of the knob 50 thus moves the magnet toward or away from the armature to determine the position at which the armature will come within the magnetic field of the magnet 48 to be snapped against the magnet.

A push rod 52 is slideably mounted within the sleeve 46, and has a relatively large pushbutton head 54 received in a counterbore 56 in the sleeve 46. A helical spring 58 is received within the counterbore and is compressed beneath the pushbutton head 54. The outer end of the sleeve 46 is provided with an inturned lip engageable outside a flange on the pushbutton 54 to prevent the pushbutton from being pushed entirely from the sleeve by the spring 58. When the armature 40 is brought into contact with the magnet 48, it can be separated therefrom by pushing on the bushbutton and thereby urging the push rod 52 against the armature.

A post 60 depends from the floor 62 about the top of the percolating well, and on this post there is mounted a curved bimetal strip 64. The bimetal passes outside a shield 66 spotwelded or otherwise secured to the floor 62, whereby the bimetal will reflect the temperature of the floor 62, and hence of the coffee being percolated, rather than provide a false reading or reaction due to heat from the main heating coil 18. A more or less Z-shaped metal strip 68 is secured to the free end of the bimetal strip 64, and is provided with a ceramic or other suitable insulating button 70 engageable with the backside of the fixed contact 30.

Figure 4:
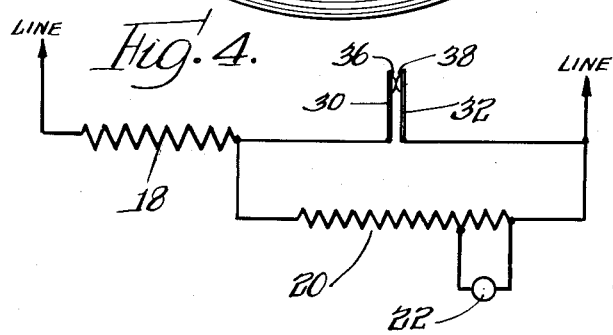
Fig. 4 is an electrical wiring diagram.

Reference should also be had to Fig. 4 for an understanding of the operation of the percolator. In this figure, it will be seen that the main heating element 18 and the "keep warm" heating element 20 are connected in series across the usual line. The indicating light 22 is connected across a part of the "keep warm" heating element 20, and the contacts 36, 38 and arms 30, 32 constitute a short circuit across this heating element. Accordingly, when the line is first plugged into the usual receptacle, the main heating element 18 is energized, thereby heating the percolating well and starting the water in the percolator to percolate. Eventually, the water is warmed sufficiently to cause the bimetal 64 to tend to straighten out, thereby carrying the ceramic button 70 against the backside of the fixed arm 30. This causes both arms to move toward the magnet 48, and depending upon the position of the magnet as determined by adjustment of the knob 50, the armature 40 eventually is snapped against the magnet, thereby moving the contacts 36 and 38 out of engagement. This throws the "keep warm" heating element 20 into series with the main heating element 18, thereby causing the indicating light 22 to light to indicate that the coffee is ready, and dropping the power developed in the main heating coil 18. The two heating coils then serve to maintain the coffee at the proper temperature until the coffeepot or percolator is disconnected from the electric receptacle. When it is desired to brew a fresh pot of coffee, the pushbutton 54 is depressed to urge the armature 40 away from the magnet 48, and thereby to move the contact 38 back into engagement with the contact 36. As will be understood, the thermostat bimetal 64 has meanwhile moved back toward its initial position.

Figure 5:
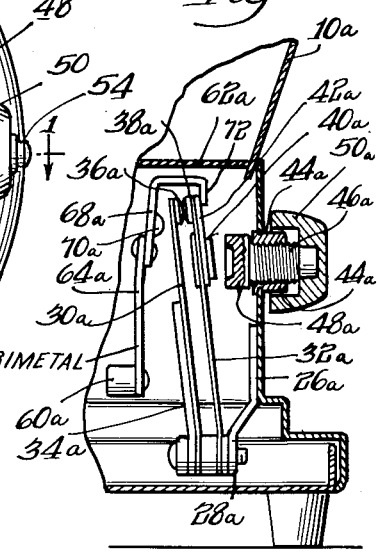
Fig. 5 is a fragmentary vertical sectional view similar to a portion of Fig. 1, but showing a modified form of the invention.

A modification of the invention is shown in Fig. 5. Most of the parts are similar to those heretofore shown and described, and similar reference numerals are utilized with the addition of the suffix a, thereby obviating the necessity of protracted description. The modification of the invention provides for automatic reset, and hence the pushbutton coaxial with the control knob is eliminated. Instead, the knob 50a is mounted on a solid cylinder 46a threaded through the bushing 44a and carrying the magnet 48a.

The bimetal 64a can be mounted horizontally as in the previous embodiment, but is shown as mounted vertically in Fig. 5 for simplicity of illustration, the bimetal being mounted on a fixed post or support 60a. A generally J-shaped metal section 68a is mounted on the end of the bimetal, having a ceramic or other insulating button 70a engageable with the fixed contact arm 30a. The metal section 68a also is provided with a reversely oriented tip 72 engageable with the insulation 42a which is extended along the outer surface of the arm 32a from beneath the armature 40a. Accordingly, when the bimetal 64a cools off and returns toward its initial position, it engages the insulation to pull the arm 32a and the armature 40a away from the magnet 48a. As will be understood, operation in the reverse direction upon heating of the bimetal is substantially identical to that previously described.

It will be understood that the two embodiments of the invention as herein shown and described are illustrative only. Various changes in structure will no doubt occur to those skilled in the art, and will be understood as forming a part of the invention insofar as they fall within the spirit and scope of the appended claims.

The invention is claimed as follows:

1. A domestic electric appliance comprising base means, electric heating means on said base means, means for connection to an electric line, a first switch arm on said base means having a first switch contact thereon, a second switch arm on said base means having a second contact thereon in cooperative opposition to said first contact, said contacts normally being in engagement, means effecting connection of said heating means to said electric connection means through said switch arm and said contacts, an armature on said second switch arm, a magnet supported from said base means substantially in alignment with said armature and attracting said armature against said magnet when said second arm tends to position said armature within a predetermined range of said magnet, a thermostatic element mounted from said base means and having presser means thereon engageable with said first switch arm on the side thereof opposite said magnet, said thermostat on heating thereof forcing said presser means against said first arm, said first arm acting through said first and second contacts to move said second arm toward said magnet whereby to move said armature within said predetermined range of said magnet, said magnet thereupon pulling said armature against said magnet and moving said second contact away from said first contact, and a manually operable pushbutton extending through said magnet, said pushbutton being engageable with said second arm opposite to said presser means for moving said armature away from said magnet and said second switch contact back into engagement with said first switch contact.

2. A domestic electric appliance as set forth in claim 1 wherein the magnet is threadedly adjustable toward and away from the armature.

3. A domestic electric appliance comprising base means, electric heating means on said base means, means for connection to an electric line, a first switch arm on said base means having a first switch contact thereon, a second switch arm on said base means having a second contact thereon in cooperative opposition to said first contact, said contacts normally being in engagement, means effecting connection of said heating means to said electric connection means through said switch arms and said contacts, an armature on said second switch arm, a magnet supported from said base means substantially in alignment with said armature and attracting said armature against said magnet when said second arm tends to position said armature within a predetermined range of said magnet, a thermostatic element mounted from said base means and having presser means thereon engageable with said first switch arm on the side thereof opposite said magnet, said thermostat on heating thereof forcing said presser means against said first arm, said first arm acting through said first and second contacts to move said second arm toward said magnet whereby to move said armature within said predetermined range of said magnet, said magnet thereupon pulling said armature against said magnet and moving said second contact away from said first contact, and a retracting element on said thermostatic element, said retracting element being engageable with said second arm opposite to said presser means for moving said armature away from said magnet and said second switch contact back into engagement with first switch contact.

4. A domestic electric appliance as set forth in claim 3 wherein the magnet is threadedly adjustable toward and away from the armature.

References Cited in the file of this patent

UNITED STATES PATENTS

| | | |
|---|---|---|
| 2,025,302 | Olds | Dec. 24, 1935 |
| 2,329,116 | Heilman | Sept. 7, 1943 |
| 2,610,284 | Kolisch | Sept. 9, 1952 |
| 2,614,481 | Huck et al. | Oct. 21, 1952 |
| 2,707,215 | Chinn | Apr. 26, 1955 |
| 2,729,717 | Visos | Jan. 3, 1956 |
| 2,762,886 | Visos | Sept. 11, 1956 |
| 2,820,881 | Huck | Jan. 21, 1958 |